United States Patent [19]

Lunde

[11] 3,946,402

[45] Mar. 23, 1976

[54] TONER APPLICATOR FOR ELECTROGRAPHIC RECORDING SYSTEM

[75] Inventor: George G. Lunde, White Bear Lake, Minn.

[73] Assignee: Minnesota Mining & Manufacturing Company, St. Paul, Minn.

[22] Filed: May 28, 1974

[21] Appl. No.: 473,328

[52] U.S. Cl. .............................. 346/74 ES; 427/261
[51] Int. Cl.[2] ................... G03G 13/14; G01D 15/06
[58] Field of Search ........ 346/74 ES, 74 EW, 74 IB, 346/74 EB; 178/6.6 A; 118/637; 96/1.4; 427/261

[56] References Cited

UNITED STATES PATENTS

| | | | |
|---|---|---|---|
| 3,257,222 | 6/1966 | Carlson | 346/74 EW |
| 3,683,406 | 8/1972 | Howell | 346/74 EW |
| 3,816,840 | 6/1974 | Kotz | 346/74 ES |

*Primary Examiner*—Bernard Konick
*Assistant Examiner*—Jay P. Lucas
*Attorney, Agent, or Firm*—Alexander, Sell, Steldt & DeLaHunt

[57] ABSTRACT

A toner applicator for delivering an optimum amount of toner powder to a recording electrode of an electrographic recording system whereby a portion of said toner may be electrographically deposited on a recording medium in the form of toner images. The toner is fed from a toner reservoir onto the recording medium in a relatively uniform layer by a toner supply means that is adjustable to vary the thickness of the toner layer deposited on the recording medium. The toner layer is then transported on the recording medium to the recording electrode, and a magnetic field is induced in the recording electrode to draw the toner layer into a position bridging between the recording electrode and the recording medium for being redeposited on the recording medium in the form of toner images.

11 Claims, 2 Drawing Figures

TONER APPLICATOR FOR ELECTROGRAPHIC RECORDING SYSTEM

BACKGROUND OF THE INVENTION

1. Field of the Invention

The present invention relates in general to the electrographic recording of toner images on a recording medium and more specifically to a means and a method for supplying an optimum amount of toner powder to a recording electrode.

2. Description of the Prior Art

Electrographic recording systems for printing toner images on a recording medium have in common the use of toner applicators for transporting toner to a recording region. Various types of toner transport systems have been devised as illustrated by Fotland et al, U.S. Pat. No. 3,121,375 and Nau et al, No. 2,932,548, which both teach the application of toner into the recording region through what serves as a recording electrode of the systems shown. Such toner applicators may serve satisfactorily in systems employing a relatively small number of recording electrodes; however, in systems having 200–400 recording electrodes per inch the application of toner through each such electrode is undesirable.

A second common method for delivering toner into the recording region is the use of a separate developing element to which toner is first applied. The developing element may be in the form of a porous endless belt on which the toner rides into the recording region as disclosed by Capps, U.S. Pat. No. 3,355,743, or in the form of a cylinder that encloses a magnet rotor, the rotation of which brings the toner into the recording region as taught in Anderson, U.S. Pat. No. 3,455,276. In Anderson, a doctor blade is employed to meter a uniform layer of toner onto the transport cylinder.

A primary deficiency with the above types of prior art toner applicators is that they do not provide sufficiently accurate metering of toner into the recording region when large numbers of narrowly spaced apart electrodes are employed in a printing array. It is difficult to precisely meter thin, uniform amounts of toner powder into the recording region without experiencing occasional plugging of metering orifices or doctor blade gaps because of toner powder agglomeration. If too much toner is transported into the recording region the toner images formed will tend to bloom out and will not have sharply defined edges. Also, when using plastically deformable toners such as thermoplastic resin, an excessive amount of toner in the recording region may increase pressure applied on the toner by the recording electrode and the recording medium to the point that there is a gradual toner build up on the recording electrode due to pressure fusing. If inadequate toner is transported onto the recording region, the formed toner images suffer a loss of density and become light or disappear altogether.

The present invention provides a toner applicator designed to overcome the deficiencies of the above described systems by accurately metering an optimum level of toner into the recording region in order that high quality, high resolution toner images may be formed.

SUMMARY OF THE INVENTION

The present invention resides in a toner applicator for an electrographic recording system that includes a pair of opposed electrodes spaced apart to define a recording region therebetween, and a recording medium that is guided through the recording region. The applicator of the present invention is formed of a toner supply means that deposits toner powder on one side of the recording medium, and a force means for drawing the toner from the recording medium into the recording region in a condition for being redeposited on the medium.

In a preferred embodiment, the toner supply means is formed of a developer roll having an inner magnet assembly and an outer rotating shell. A toner reservoir containing magnetically attractable toner powder is positioned alongside the developer roll, and toner powder is magnetically attracted therefrom onto the surface of the developer roll outer shell in a uniform layer. The toner on the developer roll is transported to and deposited on a portion of the recording medium in a layer of precise thickness through magnetic or electrographic means. Such portion of the recording medium is subsequently guided through the recording region wherein a force means formed of another developer roll attracts the toner powder from the recording medium and arranges the toner to bridge between one of the opposed electrodes and the recording medium.

The toner supply means is adjustable to vary the density of the toner layer deposited on the recording medium so that a precisely optimum amount of toner powder for producing high quality toner images is furnished to the recording region. However, the precise amount of toner deposited on the recording medium is independent of metering gaps or orifices. Thus, the present invention provides a reliable and accurate means for transporting an optimum amount of toner powder to a recording electrode of an electrographic recording system in order that high quality, high resolution toner images may be formed.

The foregoing and other advantages of the present invention will appear from the following description. In the description, reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
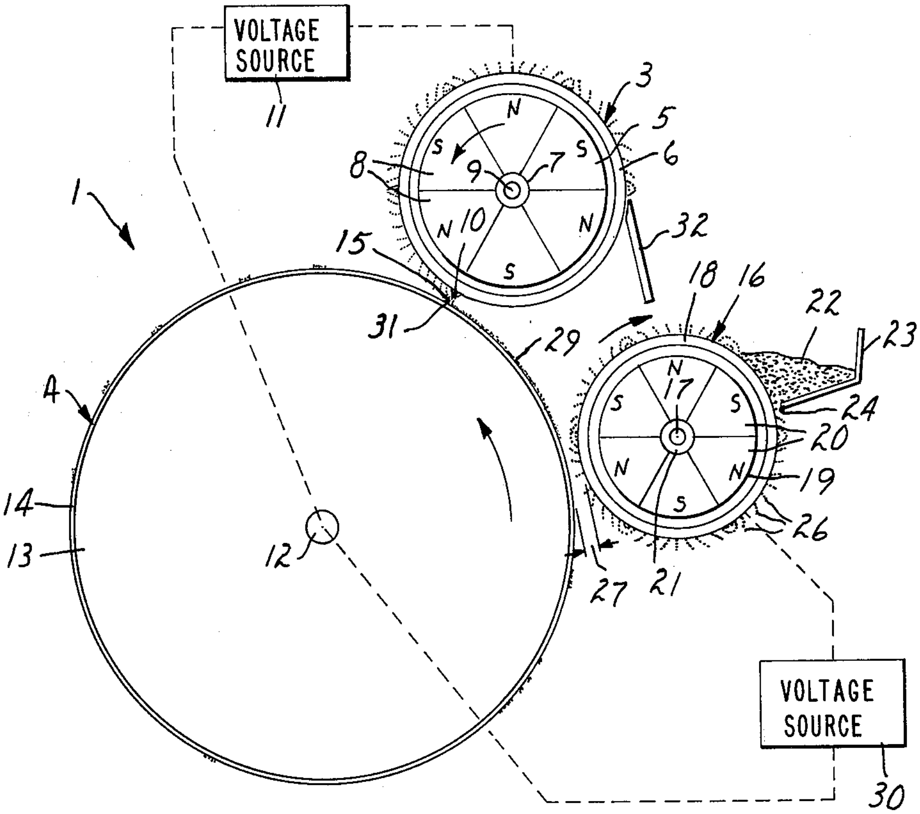
FIG. 1 is a diagrammatic end view of an electrographic recording system incorporating the toner applicator of the present invention.

Referring now to the drawings and with specific reference first to FIG. 1, a recording system 1 employing a preferred embodiment of the toner applicator of the present invention is shown. The recording system 1 includes a cylindrical developer roll 3 and a rotatable recording member 4. Except for the addition of the toner applicator of the present invention, the system 1 is similar to that taught in a U.S. application filed by Kotz on Apr. 20, 1973, and assigned Ser. No. 353,139, now U.S. Pat. No. 3,816,840, which application is incorporated herein by reference.

The developer roll 3 preferably is of the type such as disclosed in Anderson U.S. Pat. No. 3,455,276, and has an inner magnet assembly 5 and an outer cylindrical shell 6 that is electrically nonconductive and nonmagnetic. The magnet assembly 5 includes a cylindrical, magnet support core 7 and a plurality of permanent magnet sectors 8 arranged about the cylindrical periphery of the core 7 to define a surface having alternate North and South magnetic poles. The developer roll 3 is mounted on an axle 9 and is constructed such that the magnet assembly 5 rotates in a counterclockwise direction, whereas the outer shell 6 is spaced from the magnet assembly 5 and is preferably fixed in position.

Arranged on a line that extends parallel with the support core 7 are a plurality of individual, spaced apart recording electrodes 10 (only one of which is shown) that protrude from the periphery of the shell 6, but may also be disposed in the shell 6 so that the outer ends of the electrodes 10 are flush with the periphery of the shell 6.

Each electrode 10 is magnetically permeable and passes a large amount of magnetic flux emanating from the magnet sectors 8 of the developer roll 3 so that the developer roll 3 serves as a force means for providing a relatively high magnetic flux density at the outer ends of the electrodes 10. Each electrode 10 is used to print a dot that has a definition defined by its shape, density and distribution of density and the electrodes 10 are normally utilized to serve as a printing matrix. The number of electrodes 10 employed is dependent upon the printing application for which the matrix is to be used. In the case of a standard computer output line width of one hundred thirty-six, 5 × 7 dot matrix characters, nearly 1000 electrodes are employed, spaced at 70/inch. For more complex character fonts and simple graphic applications, electrode spacings of 100/inch to over 200/inch are required. A voltage source 11 supplies record voltage potential pulses to the electrodes 10 in a manner and for a purpose as will be described hereinafter.

The recording member 4 is mounted on an axle 12 that is parallel to the developer roll 3 and is rotatably driven counterclockwise to rotate in the same direction as the developer roll magnet assembly 5. The member 4 is positioned in a spaced relationship with the electrodes 10 to define a narrow recording region 15 therebetween. Forming the member 4 are an electrically conductive cylindrical electrode 13 and an endless recording medium 14 that overlies the cylindrical surface of the electrode 13. Preferably, the electrode 13 is electrically grounded, and the medium 14 is formed from an anodized aluminum.

The above described components are included in the electrographic recording system of Kotz disclosed in U.S. application No. 353,139. In addition to such components, the recording system 1 includes a second developer roll 16 that is rotatably disposed on an axle 17 and serves as a toner supply means for the recording member 4. The roll 16 is disposed in a spaced relationship with the recording member 4, similar to that existing between the electrodes 10 and the member 4. The constructions of the roll 16 and the roll 3 are similar in that the roll 16 has an electrically conductive outer shell 18 and an inner magnet assembly 19 with a plurality of permanent magnet sectors 20 disposed on a magnet support core 21. However, the roll 16 differs from the roll 3 in that the outer shell 18 rotates while the magnet assembly 19 is fixed. As the outer shell 18 rotates in a clockwise direction, a uniform layer of toner powder 22 contained in a powder reservoir 23 adjacent the developer roll 16 is laid down on the shell 18.

Figure 2:
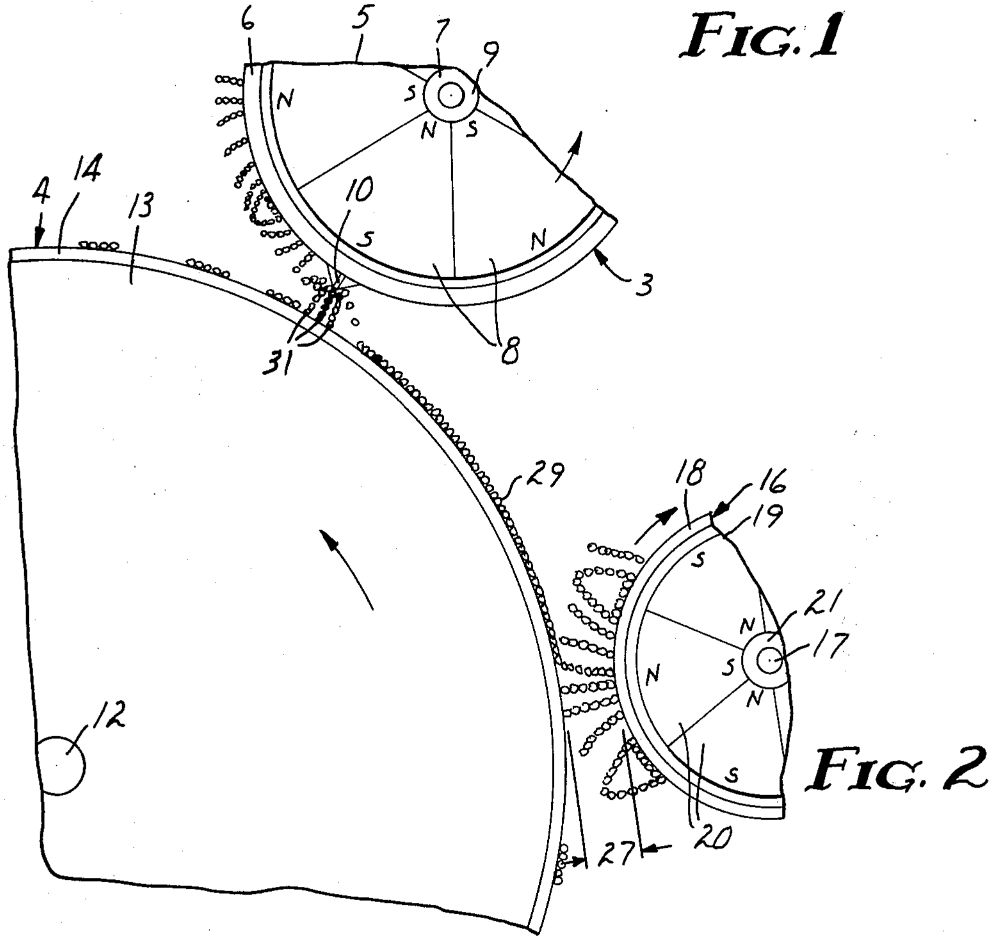
FIG. 2 is an enlarged fragmentary view of portions of the recording system of FIG. 1.

The toner 22 is magnetically attractable and electronically conductive. A suitable toner is disclosed in Nelson, U.S. Pat. No. 3,639,245. The reservoir 23 includes an adjustable doctor blade 24 for metering the toner 22 in a uniform layer onto the outer shell 18 of the developer roll 16. Due to the magnetic fields of the magnet sectors 20, the toner 22 on the shell 18 becomes arranged in the form of toner particle chains 26. Referring now to FIG. 2, the rotation of the outer shell 18 transports the toner chains 26 into a nip 27 defined by the spacing between the recording member 4 and the developer roll 16. As the toner chains 26 move through the nip 27, end portions of certain of the toner chains 26 physically contact the recording medium 14. When a sufficient voltage potential exists between the outer shell 18 and the cylindrical electrode 13, the portions of the toner chains 26 contacting the medium 14 are deposited thereon in a uniform layer 29 in accordance with the teachings of the aforementioned Kotz application. A voltage potential adequate to produce such deposition is provided by a variably adjustable voltage source 30. Thus, the source 30 may be regulated to increase or decrease the potential difference between the shell 18 and the electrode 13 to, in turn, respectively increase or decrease the density of toner in the layer 29 deposited on the medium 14. In this way, the density of toner in the layer 29 on the recording medium 14 may be precisely adjusted to provide an optimum amount of toner to the recording electrodes 10 so that the electrodes 10 will provide a print of data having a high quality definition.

It should be appreciated that there are a wide variety of means for distributing the toner 22 in a precise, uniform layer on the recording medium 14 and the use of the roll 16 is only one means for accomplishing this purpose. The essence of the present invention does not key on the use of such apparatus, but rather resides in part in the application of a precise, uniform toner layer 29 on the medium 14. Another means for achieving such results would be the use of a magnetically adjustable magnetized sheet material under the recording medium 14 to magnetically attract appropriate portions of the toner powder chains 26 to the recording medium 14.

Once deposited on the recording medium 14, the toner layer 29 is loosely held thereon and is transported on the medium 14 to the recording region 15. Thereupon, the toner layer 29 comes under the influence of the magnetic field from the developer roll 3 that exists at the outer ends of the electrodes 10 and is drawn thereby from the surface of the medium 14 into the recording region 15 to form toner chains 31. As best illustrated in FIG. 2, the toner chains 31 bridge between the electrodes 10 and the recording medium 14.

The voltage source 11 serves to provide voltage record pulses to the electrodes 10 to produce a potential difference between the electrodes 10 and the grounded electrode 13. Such potential difference results in toner deposition on the recording medium 14 as previously discussed with reference to the developer roll 16. However, the electrodes 10 are selectively pulsed by the source 11 to form toner images on the medium 14 rather than a uniform layer of toner powder as provided by the roll 16. The portion of the toner 22 that is deposited on the medium 14 in the form of toner images initially has a relatively high charge and is held on the medium 14 by the potential difference between the charged toner 22 and the grounded electrode 13. However, the charge on the deposited toner 22 rapidly dissipates so that when the deposited toner 22 approaches the nip 27, it is attracted from the medium 14 by the magnets of the developer roll 16.

All of the toner 22 that is delivered to the recording region 15 may not be redeposited upon the medium 14 in the form of recorded toner images. Instead a portion of the toner 22 may be held on the outer shell 6 of the developer roll 3 and transported in a clockwise direction around the periphery of the shell 6 by the rotation of the magnet assembly 5. The nonrecorded toner 22 remains on the developer roll 3 until it reaches the chute 32. One end of the chute 32 is in contact with the periphery of the developer roll 3 to remove the particles of toner powder 22 coming from the recording region 15 and gravity feed them onto the periphery of the second developer roll 16. The nonrecorded toner 22 is thereupon transported by the roll 16 back to the toner reservoir 23. Accordingly, the chute 32 and the developer roll 16 serve as a toner transport means for carrying the nonrecorded toner 22 from the developer roll 3 to the reservoir 23.

Thus, the present invention provides a toner applicator that furnishes a precisely optimum amount of toner to the recording region 15 in a manner that is not dependent for its preciseness upon the use of metering orifices or gaps that are susceptible to being plugged with toner powder. The employment of the developer roll 16 as a toner supply means provides a precise amount of toner 22 to the recording medium 14 in order that an optimum amount of toner is transported to the recording region 15 for producing dense, well defined images, and the roll 16 also serves as a means for later erasing the toner images.

What is claimed is:

1. An electrographic recording system that records toner images on a recording medium and includes first and second opposed electrodes spaced apart to define a recording region therebetween, means for driving the recording medium through said recording region, and a toner applicator for transporting electrically conductive toner powder from a toner reservoir to said recording region into a condition for being selectively deposited on said recording medium in response to the selective application of voltage record pulses across said electrodes, which toner applicator comprises:

a toner supply means for depositing a precise amount of said toner powder on a portion of one surface of said recording medium in a uniform layer of adjustable density, which toner powder is deposited prior to said portion entering said recording region; and a force means for attracting said toner powder from said portion of said recording medium as said portion enters the recording region, and for arranging said toner to bridge between said first of said electrodes and said recording medium.

2. A recording system as recited in claim 1 wherein the second of said electrodes is in the form of a cylinder and the recording medium overlies the cylindrical surface of said cylinder.

3. A recording system as recited in claim 1 wherein said first of said electrodes is located at the periphery of the force means.

4. A recording system as recited in claim 1 wherein said toner powder is magnetically attractable and is magnetically attracted from said portion of said recording medium by said force means as said toner enters the recording region.

5. A recording system as recited in claim 4 wherein said force means comprises a first cylindrical magnetic developer roll that draws the portion of the toner powder that is not selectively deposited on said medium out of the recording region and onto the outer shell of said developer roll.

6. A recording system as recited in claim 5 wherein a toner transport means is associated with said first developer roll for returning the undeposited portion of the toner to the toner supply means.

7. A recording system as recited in claim 6 wherein a portion of said toner powder bridging between said first electrode and said recording medium is redeposited on said recording medium in the form of toner images and said redeposited toner is later erased from said medium by said toner supply means.

8. A recording system as recited in claim 4 wherein said toner supply means comprises a second cylindrical magnetic developer roll that draws toner powder from said reservoir onto the outer shell of said second roll, which toner powder is transported thereon and deposited on said recording medium to provide said uniform layer.

9. A process for supplying toner powder to the recording region of an electrographic recording system, which process comprises:

1. arranging first and second electrode means in a spaced opposed relationship to provide a recording region therebetween;
2. guiding a recording medium through said recording region;
3. depositing a uniform layer of toner powder on a portion of said recording medium prior to movement of the recording medium through said recording region;
4. attracting the toner powder from said portion of said recording medium when said portion enters said recording region; and
5. arranging the toner powder from said portion of said medium to bridge between one of said electrodes and the recording medium.

10. A process as recited in claim 9 wherein said toner powder is magnetically attractable.

11. A process as recited in claim 9 wherein a further step includes selectively applying voltage record pulses across said electrode means causing a portion of said toner bridging between said one of said electrodes and said recording medium to be redeposited on said recording medium.

* * * * *